United States Patent

Lemaitre

[11] 4,119,366
[45] Oct. 10, 1978

[54] MIRRORS WITH A VARIABLE FOCAL DISTANCE

[75] Inventor: Gérard R. Lemaitre, Aix-en-Provence, France

[73] Assignee: Agence Nationale de Valorisation de la Recherche- A.N.V.A.R., France

[21] Appl. No.: 746,792

[22] Filed: Dec. 2, 1976

[30] Foreign Application Priority Data

Mar. 5, 1976 [FR] France .............................. 76 07577

[51] Int. Cl.² ................................................ G02B 5/10
[52] U.S. Cl. ..................................................... 350/295
[58] Field of Search ................ 350/295, 320, 293, 296

[56] References Cited

U.S. PATENT DOCUMENTS

| | | | |
|---|---|---|---|
| 3,514,776 | 5/1970 | Mulready | 350/295 |
| 3,893,755 | 7/1975 | Cobarg et al. | 350/295 |
| 3,972,600 | 8/1976 | Cobarg | 350/295 |

FOREIGN PATENT DOCUMENTS

| | | | |
|---|---|---|---|
| 2,256,642 | 5/1974 | Fed. Rep. of Germany | 350/295 |
| 728,748 | 7/1932 | France | 350/295 |

*Primary Examiner*—Jon W. Henry

[57] ABSTRACT

Mirrors with a variable focal distance composed of a disc of revolution about an axis having a reflecting surface. Said disc has a variable thickness and is bent elastically by applying thereto a distributed load or an axial load and by balancing this load by a central or peripheral bearing pressure. The deformation obtained is parobolic provided that the variable thickness of the disc varies as a function of the radius from the axis.

5 Claims, 4 Drawing Figures

MIRRORS WITH A VARIABLE FOCAL DISTANCE

The present invention relates to mirrors with a variable focal distance and methods for obtaining them by elastic deformation.

The technical sector of the invention is that of the construction of mirrors or networks.

Elastic deformations of a disc, by bending, have already been employed in order to obtain aspherical, axisymmetrical surfaces, to correct the distortions of the spherical dioptres.

These elastic deformations have been used during surfacing so that a perfectly flat or spherical reflecting surface is firstly produced which can be manufactured with a very high precision, of the order of $0.1\mu$ and the applied stresses are then relaxed so that the flat or spherical surface deforms elastically.

The elastic deformation may also be applied to a flat or spherical reflecting surface, after the surfacing thereof, so that the deformations may be varied by modifying the applied stresses.

In both cases, the surface obtained depends essentially on the one hand on the load and support conditions of the disc being bent and on the other hand on the geometrical form of the disc, i.e. the section of the disc along a transverse cross-section passing through the axis of symmetry.

The elastic deformation of a disc with parallel faces, placed on peripheral supports and bent by a uniformly distributed load or by a concentrated load applied to the centre, has already been employed. In this way, a pronounced curvature is obtained at the centre which extends laterally by a surface of truncated appearance. Such a deformation may provide a satisfactory solution as long as the elastic bend does not exceed a half-wave length, but such is not suitable for greater flexions.

Mathematical formulae have already been proposed which comprise several parameters and which define families of surfaces which determine numerous disc sections. These formulae make it possible, for determined support and load conditions, to define families of possible shapes of circular blanks enabling reflecting surfaces, responding to determined mathematical definitions, to be obtained by bending.

The general support and load conditions of a circular blank enabling said latter to be elastically deformd in flexion, may be various.

Of course, if it is desired to obtain a deformation of revolution with respect to the axis perpendicular to the blank, the support and load conditions must also be symmetrical with respect to this axis.

There are three support and load configurations symmetrical with respect to the axis, which are simpler to effect than the others and which are therefore of particular practical interest.

It will be seen hereinafter that these three configurations lead to a very precise definition of the section of the circular blanks enabling a deformation of purely parabolic expression to be obtained, i.e. a deformation which varies proportionally to the square of the distance from the axis.

These three configurations are obtained by combining in two's the following three support and load conditions which are easy to effect and which lead to a bending:

(a) uniformly distributed load (b) load or support concentrated at the centre.

(c) peripheral support.

The following three configurations are obtained:

Configuration I: $a + c$: uniform load in equilibrium with a peripheral support.

Configuration II: $b + c$: central load in equilibrium with peripheral support.

Configuration III: $a + b$: uniform load in equilibrium with central support.

It is an object of the present invention to procure a general definition of the sections of a reflecting blank, of revolution about an axis, such that, in the three support and load conditions defined hereinabove, a deformation is obtained of purely parabolic expression, so that, starting from any reflecting surface incorporated in an optical focussing device, a displacement is obtained of the focal surface associated with the variation of intensity of the forces applied, said displacement being due to the deformation.

Another object of the invention is to define the section of a blank of revolution corresponding to each of the three load and support configurations defined hereinabove, enabling a purely parabolic deformation to be obtained which has the advantage over any other deformation of displacing the focal surface of an optical system without altering anything else.

The processes according to the invention consist, in known manner, in varying the focal distance of a mirror or an optical system by elastically deforming, by bending, a blank of revolution about an axis having, at rest, a reflecting face, for example a flat, spherical or parabolic face.

The objects of the invention are achieved by using a blank of radius H having a reduced thickness $h/H$ defined by the following equation:

$$\frac{h}{H} = - [12(1 - \nu)\Omega \frac{p}{E}] \cdot (i\rho - j\ln\rho + k) \tag{4}$$

E being Young's modulus and $\nu$ Poisson's ratio of the material of the blank.

$\Omega$ is the so-called closure coefficient of the mirror.

$p$ is the load per unit of surface of the blank.

$\rho = r/H$ is the reduced radius included between 0 and 1.

$i, j, k$ are integers equal to 1, 0 or $-1$ according to the load and support conditions indicated hereinbelow.

In a first configuration, a uniformly distributed load is exerted, which is balanced by a peripheral bearing pressure on a blank whose reduced thickness is defined by the equation:

$$\frac{h}{H} = [12(1 - \nu)\Omega \frac{p}{E}] \cdot (1 - \rho). \tag{6}$$

In a second support and load configuration, a concentrated axial load is exerted which is balanced by a peripheral bearing pressure on a blank whose reduced thickness is defined by the equation:

$$\frac{h}{H} = [12(1 - \nu)\Omega \frac{p}{E}] \cdot (-\ln\rho). \tag{7}$$

In a third support and load configuration, a uniformly distributed load is exerted, balanced by a peripheral bearing pressure, on a blank whose reduced thickness is defined by the equation:

$$\frac{h}{H} = [12(1 - \nu)\Omega \frac{P}{E}] \cdot (\rho - \ln\rho - 1). \quad (8)$$

The result of the present invention is a novel mirror with a variable focal distance obtained by elastic deformation of a circular blank having a reflecting face which is bent.

The sections of the blanks according to the invention make it possible to obtain, by bending, perfectly spherical surfaces for mirrors whose aperture is small with respect to the radius.

The method according to the invention enables the focal distance of the mirrors or the optical devices in which said mirrors are incorporated to be varied, by varying the intensity of the load applied thereto.

The sections of the blanks corresponding to the three support and load configurations which are the most simple to realise, are defined by precise equations enabling these blanks to be made with a very high precision in order then to obtain, by bending, a deformation of purely parabolic expression. It is known that the reflecting faces of the mirrors are surfaced with a very high precision, of the order of 0.1μ and it is therefore essential to be able to vary the curvature of the reflecting face without destroying the geometrical precision thereof. The sections according to the invention make it possible to arrive at this result which is very difficult to attain.

The mirrors with a variable focal distance according to the invention further enable the defects of curvature to be corrected with an excellent precision on the geometrical continuity of the reflecting surfaces.

The mirrors according to the invention find applications in the following domains:

compensation of the field of the interferometers by Fourier transform.

adjustment of the parallelism of the beam in a Laser resonant cavity.

servo-control system of the curvature of a mirror by acting on the intensity of the applied forces.

The invention will be more readily understood on reading the following description with reference to the accompanying drawings, in which.

Figure 1:
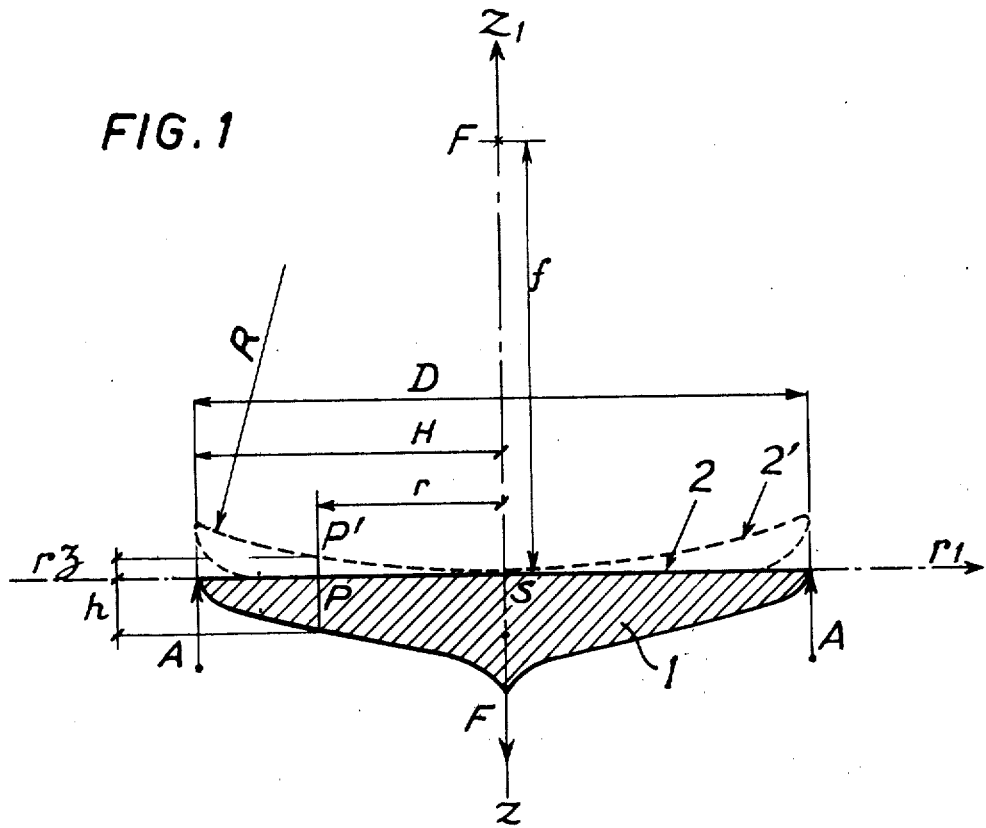
FIG. 1 is a schematic geometrical view.

Referring now to the drawings, FIG. 1 is a geometrical representation intended to define the notations used. Reference 1 represents a blank in the form of a disc of revolution about an axis Z-Z1. This blank has a reflecting surface 2 which has been surfaced with a very high precision, of the order of 0.1μ and which for example is a flat surface perpendicular to the axis Z-Z1. H represents the radius of the circular blank and $r$ the distance to the axis of a running point P of the surface 2.

The blank 1 is elastically deformed, for example by applying an axial force F which is balanced by a peripheral support A, both represented by arrows. The blank bends so that the surface 2 becomes the surface 2' shown in broken lines and the running point P passes to P'. It is displaced parallel to axis Z-Z1 by an amount $z$. It is desired that the surface 2' be a spherical or parabolic surface having a radius of curvature R. This surface constitutes a spherical or parabolic mirror of aperture D and of focal distance $f$, the focus F being located at half the distance SO, S being the vertex and O the centre of the spherical surface osculating with the mirror.

The problem to be solved is as follows: can one define a section of the blank 1, i.e. define the thickness $h$ as a function of $r$ so that, for each of the three load and support configurations which have been defined previously, the value of $z$ has a purely parabolic expression, i.e. that $z$ varies proportionally to $r^2$?

Let $\rho = r/H$. $\rho$ is the reduced radius which varies between 0 and 1.$\Omega = f/D = R/4H.\Omega$ is the so-called closure coefficient of the mirror.

It will be recalled that the first terms of the development in series of the equation of a sphere of vertex S and radius R referring to the axes Z-Z1 and r-r1 is the form:

$$z = \frac{r^2}{2R} + \frac{r^4}{8R^3} + \ldots$$

Since R is fairly large before $r$, the second term is negligible and the equation of the surface of the sphere near the vertex S may be assimilated to the expression:

$$z = \frac{r^2}{2R} = \frac{H\rho^2}{8\Omega}$$

This demonstrates that it suffices, to obtain a deformation $z$ of purely parabolic expression, i.e. proportional to $\rho^2$ for the surface 2' obtained by deformation to be a spherical surface.

An initial flat surface 2 has been considered, but it is seen that the same result is obtained if the initial surface 2 is a spherical or parabolic surface, i.e. a surface such that the distance of the current point P with respect to the plane tangential to the vertex S is of the form $a\rho^2$, and if this surface is deformed by an amount equal to $b\rho^2$ since a new surface is finally obtained whose equation is of the form $(a+b)\rho^2$ which remains a parabolic expression.

The rigidity D of a disc of thickness $h$ is conventionally written $D = Eh^3/12(1 - \nu^2)$, E being Young's modulus and $\nu$ Poisson's ratio of the material.

On the other hand, it is demonstrated that the differential equation which translates the equilibrium of an elementary cylindrical sector may be written as follows:

$$\frac{d\phi}{\rho} + (\frac{1}{D} \frac{dD}{d\rho} + \frac{1}{\rho}) \frac{d\phi}{d\rho} + \quad (2)$$

$$(\frac{\nu}{\rho} \cdot \frac{1}{D} \cdot \frac{dD}{d\rho} - \frac{1}{\rho})\phi = \frac{QH}{D}, \phi = \frac{dz}{d\rho} = \frac{\rho}{4\Omega}$$

being the inclination of the deformation and Q the radial cutting stress per unit of length of an elementary cylindrical section.

The radial cutting stress Q is a function of the load and support conditions.

In the three configurations mentioned hereinabove, comprising a uniform load $p$ or an equivalent concentrated load $F = \pi H^2 p$, the cutting force is written for the three configurations:

$$Q = \frac{1}{2}(\rho + \frac{i}{\rho})pH$$

in which expression $i$ and $j$ have values 1, 0 or $-1$ according to which of the three configurations is chosen.

For a deformation $z$ of purely parabolic expression, the resolution of the differential equation (2) gives:

$$D = \frac{4\Omega}{1-v} H \int \phi dp = \frac{\Omega}{1-v} pH (ip + j\ln p + k). \quad (3)$$

$k$ being a constant integer determined by the conditions at the limits for the thickness of the blank to be zero at the periphery and ln $\rho$ being the Naperian logarithm.

By equalizing the two expressions (1) and (3) of D, the following is obtained:

$$\frac{h}{H} = [12(1-v)\Omega \frac{p}{E}] \cdot G(\rho) \quad (4)$$

$$\text{with } G(\rho) = (i\rho + j\ln\rho + k). \quad (5)$$

The mathematical expression (5) is an expression without dimensions, independant of the values E and $v$ which characterize the material of the blank. This expression generally defines the relative thickness $h/H$ of all the blanks of revolution which enable a deformation $z$ of purely parabolic expression to be obtained and therefore enable a flat, spherical or parabolic surface to be deformed into a new spherical or parabolic surface by varying the focal distance of the mirror.

As a variant, the stress producing the elastic deformations may be applied during the flat or spherical surfacing of the reflecting face then modified after machining in order to vary the focal distance of the mirror by relaxing the stresses or by increasing them.

From the general expression of the reduced thickness $h/H$ defined by equations (4) and (5), the equations of the sections of the blanks which are used in the three configurations I, II and III defined hereinabove, which correspond to simple support and load conditions, easy to effect in practice, are established easily.

In the case of the surface 2 being a spherical or parabolic surface, $h$ designates the distance between the front and rear faces of the blank, i.e. the thickness of the blank.

Figure 2:
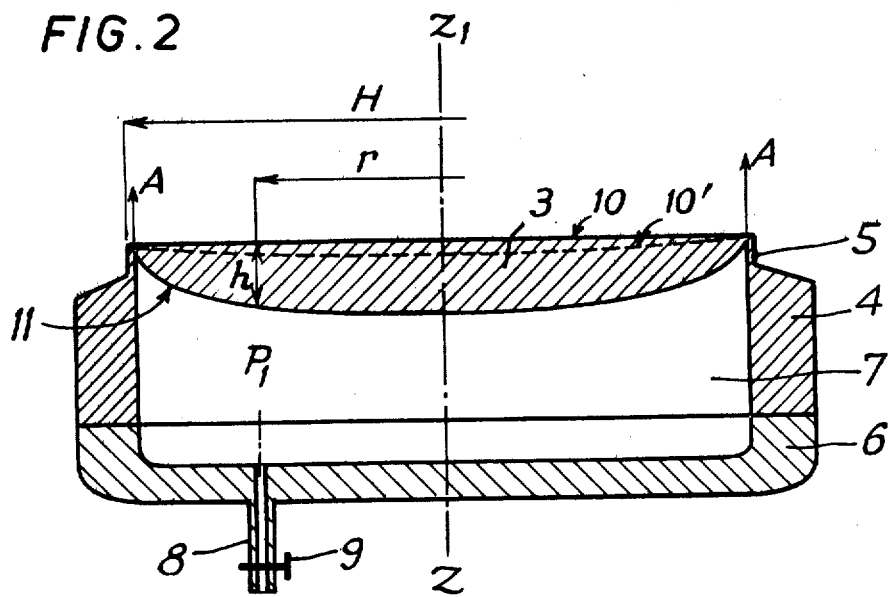
FIGS. 2, 3 and 4 illustrate devices according to the invention for varying the curvature of a mirror according to three load and support configurations which in practice are easy to make.

FIG. 2 shows an embodiment of a device according to the invention to obtain a spherical or parabolic mirror with variable focal distance by elastic bending.

A blank 3 of revolution about axis Z–Z1 is used. This blank is constructed in a flexible material, e.g. steel, metal alloy, glass or any other material usually used for making mirrors or recopying matrices for obtaining spherical dioptres.

The device used comprises a support 4 on which the blank 3 abuts by its periphery 5. This support is constituted for example by a crown forming one piece with the blank 3 to which it is connected by a very thin cylindrical flange so that the geometrical position of the support which determines the aperture 2H of the mirror is defined with very high precision.

The crown 4 is hermetically connected to a base 6 so that the blank 3, the crown 4 and the base 6 form a tight enclosure 7. This enclosure comprises a pipe 8 provided with a valve 9 enabling it to be connected to a suction or compression device for creating in the enclosure a pressure $p1$ which is different from ambiant pressure $p0$.

The blank 3 is subjected on the one hand to a uniformly distributed load $p$ equal to the difference in pressure $p0 - p1$ and on the other hand to peripheral bearing pressures A which balance.

The blank 3 has an upper reflecting face 10 of radius H, which is surfaced with a very high precision of the order of 0.1 micron in order to constitute, for example, a strictly flat surface perpendicular to axis Z–Z1.

As a variant, the face 10 may be surfaced in spherical or parabolic, convex or concave form.

The rear face of the blank is limited by a surface 11, of revolution about the axis Z–Z1 so that the thickness $h$ of the blank is constant for all the points placed at the same distance $r$ from the axis Z–Z1. The surface 11 is perfectly defined when the equation of $h$ as a function of $r$ or of $r/H = \rho$ is known.

FIG. 2 corrresponds to configuration I in which the load $p$ is uniformly distributed and is balanced by a peripheral support. In this case, the constants of the equation (5) are $i = 1, j = 0$ and $k = -1$ and the equation which defines the reduced thickness $h/H$ of the blank is as follows:

$$\frac{h}{H} = [12(1-v)\Omega \frac{p}{E}] \cdot (1-\rho). \quad (6)$$

This equation defines a family of related curves having the appearance shown in FIG. 2, i.e. a maximum thickness at the centre equal to $(12(1-v)\Omega p/E)$ and a thickness which tends towards zero at the periphery.

The blank 3 having the section of thickness determined by the equation (6) subjected to a uniformly distributed load balanced by a peripheral bearing pressure is deformed by bending and the deformation of the running point of the face 10 located at a distance $r$ from the axis is proportional to $r^2$ so that the face 10' is a parabolic surface assimilable to a spherical surface whose vertex is on axis Z–Z1.

If $p1 < p0$, a surface 10' is obtained in the form of a concave mirror whose radius and the focal distance decrease when the difference in pressure $p = p0 - p1$ increases and, inversely, increase if $p$ decreases.

If $p1 > p0$ and if the face 10 were flat at rest, a convex face 10 is obtained therefore having a negative focal distance and the absolute value of this focal distance decreases when the load $p = p1 - p0$ increases.

One may also start from a surface 10 in the form of a spherical or parabolic, convex or concave mirror and vary the focal distance by placing the enclosure 7 under pressure or depression.

Figure 3:
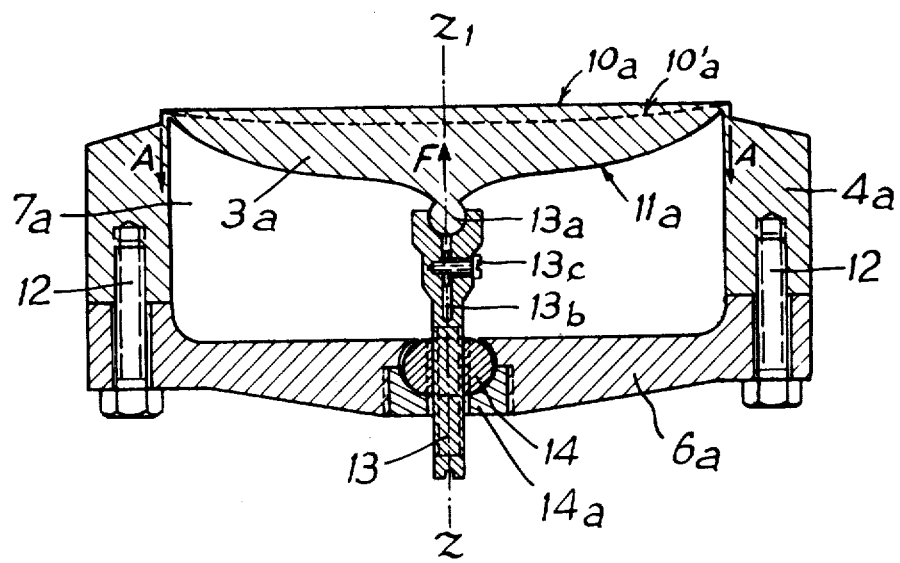

FIG. 3 shows a second embodiment of a device according to the invention corresponding to a second support and load configuration. The parts homologous to those of FIG. 2 have the same references followed by letter $a$. The only difference is that the blank is subjected to a concentrated axial load F balanced by peripheral bearing pressures A. Moreover, this Figure shows the bolts 12 which hermetically assemble the crown 4a and the base 6a together.

The parameters of the equation (5) take the following values in the load and support conditions of FIG. 3. $i = 0, j = 1, k = 0$ and the equation which defines the section of reduced thickness $h/H$ and the surface 11a is:

$$\frac{h}{H} = 12(1-v)\Omega \frac{p}{E} \cdot (-\ln\rho) \quad (7)$$

This equation defines a family of related curves having the form shown in FIG. 3, i.e. a zero thickness at the periphery and an infinate thickness at the centre. In practice, the central thickness may be limited without this limitation substantially modifying the form of the deformation.

The theoretical extension of the blank has been shown in broken lines in the Figure. The force F is exerted for example by means of an axial screw 13 which is fast with a spherical swivel joint 13a fixed to the vertex of the blank. This screw comprises, for example, a slot 13b over part of its length, so that it forms two spherical half-cavities in which the swivel joint 13a is engaged. A screw 13c makes it possible to maintain the two half-cavities together, after the swivel joint has been engaged therein. The screw 13 is screwed in a threaded bore passing through a swivel joint 14 which is engaged in a spherical housing made in the base 6a. A nut 14a maintains the swivel joint 14 in its housing. By screwing or unscrewing the screw 13, a force F is exerted on the blank 3a which is either an upwardly directed thrust as shown in the Figure or a downwardly directed pull. The swivel joints 13a and 14 make it possible to avoid the screw 13 transmitting to the blank 3a forces other than axial forces.

Where only a pull is exerted, the periphery of the blank 3a may simply abut on the crown 4a without these parts being fast.

The spherical surface 10a, obtained from a flat surface 10a, has been shown in broken lines. The deformations lead to a spherical or parabolic surface 10a which is concave where F is a pulling force and convex where F is a thrust.

Figure 4:
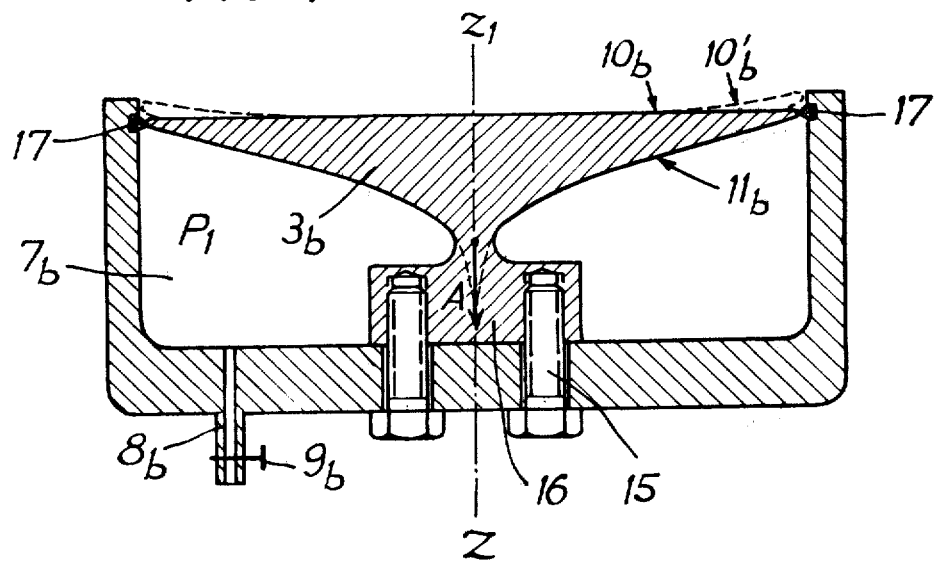

FIG. 4 shows a third embodiment of a device according to the invention corresponding to a third support and load configuration.

The parts homologous to those of FIG. 2 are designated by the same references followed by the letter b.

In this configuration, the blank 3b is fixed by its vertex, for example by means of a disc 16 which is fast with the blank and which is maintained fixed to the bottom of the casing 6b via screws 15. The edges of the blank 3b are not mechanically connected to the walls of the casing so that they may move freely. An O-ring 17 is interposed between the edges of the blank and the walls of the casing and forms a tight fitting. The casing 6b comprises a pipe 8b provided with a valve 9b which enables the pressure p1 inside the enclosure 7b defined by the casing 6b and the blank 3b to be varied. The blank 3b is subjected to a uniformly distributed load p equal to the difference in pressure p1 − p0.

In this load and support configuration, the parameters of the equation (5) take the following values: $i = -1, j = 1, k = 1$ and the equation which defines the section of the blank 3a is as follows:

$$\frac{h}{H} = [12(1 - \nu)\Omega \frac{p}{E}] (\rho - \ln\rho - 1) \quad (8)$$

FIG. 4 shows the shape of the surface 11b produced by the meridian curve which corresponds to the above equation (8).

The thickness h is zero at the periphery and infinite at the centre. In practice, the central thickness may be limited by truncating the vertex without the shape of the deformation obtained by bending being modified.

FIG. 4 shows the extension of the theoretical section in broken lines.

The concave surface 10b, obtained when p1 > p0 has been shown in broken lines. By varying p1, the focal distance of the spherical mirror is modified.

FIGS. 2, 3 and 4 show devices which make it possible continuously to modify the focal distance of a mirror or an optical device comprising such a mirror during use thereof simply by varying the pressure p1 or a force F. The result obtained may then be optically verified and the focal distance may be adjusted to a determined value with very high precision.

The preceding examples concern blanks having, at rest, a flat, spherical or parabolic reflecting face, so that by parabolic deformation of said blanks, a new flat, spherical or parabolic surface is obtained.

However, it is clearly specified that the invention is not limited to such reflecting surfaces and may be applied to any reflecting surface having, at rest, any form.

In this case, the sections defined by the present invention make it possible to obtain a deformation of purely parabolic appearance of which one of the interests is to allow a displacement of the focal surface of a mirror or an optical system in which said mirror is integrated without having to add new components to the system.

Without departing from the scope of the invention, the elements constituting the devices which have just been described by way of example may of course be replaced by equivalent elements. In particular, the concentrated loads and forces which produce the bending of the blank may be obtained by any other equivalent means for example by piezoelectricity, by magnetostriction, by electrostriction, etc.

What is claimed is:

1. Mirror with a variable focal distance comprising a blank of a flexible material, of revolution about an axis, in the general form of a disc having a reflective face which has been surfaced with high precision and a rear face, opposite to said reflective face; an external radius H and a thickness h between said two faces which depends on the distance r to said axis, which disc is elastically bent by means of a variable pressure applied uniformly on one face which pressure is balanced by the reaction force of a peripheral support on which said disc bears and the reduced thickness h/H of said disc is defined at each point of said disc placed at a reduced distance $\rho = r/H$ from said axis by the formula $$\frac{h}{H} = [12(1 - \nu)\Omega \frac{p}{E}] \cdot (1 - \rho 2)^{\frac{1}{3}}$$

in which E and ν are respectively Young's modulus and Poisson's ratio of the material of the blank, Ω is the so-called closure coefficient of the bent mirror, p is the uniform load per unit of surface of the disc for bending said disc, and $\rho = r/H$ is the reduced distance of the point from the axis and is included between 0 and 1, said blank comprising a crown forming one piece with the disc to which it is connected by a very thin cylindrical flange which forms said peripheral support, which crown is hermetically connected to a base so that the disc, the crown and the base form a tight enclosure, which enclosure comprises means for creating in the enclosure a variable pressure, different from ambiant pressure.

2. Mirror with a variable focal distance comprising a blank of a flexible material, of revolution about an axis, in the general form of a disc having a reflective face, which has been surfaced with high precision and a rear face, opposite to said reflective face, an external radius H and a thickness h between said two faces which depends on the distance r to said axis, which disc is elastically bent by means of an axial force of variable intensity F applied on the center of said rear face, which force is balanced by the reaction force of a peripheral support on which said disc bears and the reduced thickness $h/H$ of said disc is defined at each point of said disc placed at a reduced distance $\rho = r/H$ from said axis by the formula:

$$\frac{h}{H} = [12(1-\nu)\Omega \frac{p}{E}] \cdot (\rho - \ln\rho)$$

in which $E$ and $\nu$ are respectively Young's modulus and Poisson's ratio of the material of the blank, $\Omega$ is the so-called closure coefficient of the bent mirror. $p = F/s$ is equal to the ratio between the intensity of the force $F$ for bending said disc and the surface of said disc, $\rho = r/H$ is the reduced distance of the point from the axis included between 0 and 1, and $\ln \rho^2$ is the Napierian logarithm of the square reduced radius.

3. Mirror with a variable focal distance comprising a blank of a flexible material, of revolution about an axis, in the general form of a disc having a reflective face which has been surfaced which high precision and a rear face, opposite to said reflective face, an external radius $H$ and a thickness $h$ between the two faces which depends on the distance $r$ to said axis, which disc is elastically bent by means of a variable load uniformly distributed on a face of said disc which load is balanced by the axial reaction force of a fixation secured to the center of the rear face of said disc and the reduced thickness $h/H$ of said disc is defined in each point of said disc placed at a reduced distance $\rho = r/H$ of said axis by the formula:

$$\frac{h}{H} = [12(1-\nu)\Omega \frac{p}{E}] \cdot (\rho - \ln\rho - 1)$$

in which formula $E$ and $\nu$ are respectively Young's modulus and Poisson's ratio of the material of the blank, $\Omega$ is so-called closure coefficient of the bent mirror, $p$ is the uniform load per unit of surface of the disc for bending said disc, $\rho = r/H$ is the reduced distance of the point from the axis included between 0 and 1 and $\ln \rho^2$ is the Napierian logarithm of the square reduced radius.

4. Mirror according to claim 2 in which said blank comprises a crown forming one piece with the disc to which it is connected by a very thin cylindrical flange which constitutes said peripheral support whose geometrical position is defined with high precision and said disc comprises means for applying a variable axial force to the center of the rear face of said disc.

5. Mirror according to claim 3 in which said disc is placed inside a casing, the edge of the disc moving freely in said casing and means being placed between the edge of said disc and the walls of said casing to form a tight fitting, and said casing comprises means for creating in said casing a variable pressure different from ambiant pressure for maintaining fixed the center of the rear face of said disc.

* * * * *